United States Patent
Choi

(10) Patent No.: US 6,690,730 B2
(45) Date of Patent: Feb. 10, 2004

(54) MOTION ESTIMATOR

(75) Inventor: Sung-kyu Choi, Kwangmyung (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 495 days.

(21) Appl. No.: 09/770,235

(22) Filed: Jan. 29, 2001

(65) Prior Publication Data

US 2001/0028681 A1 Oct. 11, 2001

(30) Foreign Application Priority Data

Jan. 27, 2000 (KR) .......................................... 2000-4049

(51) Int. Cl.[7] ................................................. H04N 7/12
(52) U.S. Cl. .................................. 375/240.16; 348/699
(58) Field of Search ....................... 375/240.16, 240.17; 348/699, 700, 416.1; 382/236, 238

(56) References Cited

U.S. PATENT DOCUMENTS

| | | | | |
|---|---|---|---|---|
| 5,706,059 A | * | 1/1998 | Ran et al. .................... | 348/699 |
| 6,118,901 A | * | 9/2000 | Chen et al. .................. | 382/236 |
| 6,160,850 A | * | 12/2000 | Chen et al. ............. | 375/240.16 |
| 6,259,737 B1 | * | 7/2001 | Fung et al. ............. | 375/240.16 |
| 6,363,117 B1 | * | 3/2002 | Kok ....................... | 375/240.24 |
| 6,377,623 B1 | * | 4/2002 | Ra et al. ..................... | 375/240 |
| 6,414,997 B1 | * | 7/2002 | Piccinelli et al. ...... | 375/240.17 |
| 6,549,575 B1 | * | 4/2003 | Butter et al. ........... | 375/240.16 |
| 6,563,874 B1 | * | 5/2003 | Lu ........................ | 375/240.12 |
| 6,584,155 B2 | * | 6/2003 | Takeda et al. .......... | 375/240.16 |

OTHER PUBLICATIONS

Jong et al, "Parallel architectures for 3–step hierarchical search block–matching algorithm", IEEE Transactions on Circuits and Systems for Video Technology, vol. 4, iss. 4, pp. 407–416, Aug. 1994.*

Liu et al, "New fast algorithms for the estimation of block motion vectors", IEEE Transactions on Circuits and Systems for Video Technology, vol. 3, Iss. 2, pp. 148–157, Apr. 1993.*

Panusopone et al, "A fast motion estimation algorithm using hierarchical matching criteria", 42nd Midwest Symposium on Circuits and Systems, vol. 1, pp. 538–541, Aug. 1999.*

Wang et al, "Zero waiting–cycle hierarchical block matching algorithm and its array architectures", IEEE Transactions on Circui and Systems for Video Technology, vol. 4, iss. 1, pp. 18–28, Feb. 1994.*

* cited by examiner

*Primary Examiner*—Vu Le
(74) *Attorney, Agent, or Firm*—Sughrue Mion, PLLC

(57) ABSTRACT

A motion estimator capable of performing fast motion estimation during compression of a moving picture is provided. The motion estimator includes a first memory including a previous search area memory having a plurality of memory areas for storing previous search area data by lines and a current process area memory for storing current process area data by lines; a previous search area data provider; a first switching part for selecting the previous search area data; a second switching part for selecting the current process area data; a calculator comprising a plurality of sum of absolute differences (SAD) calculators connected in parallel, the plurality of SAD calculators calculating SADs of the selected previous search area data and the current process area data; and a shift register for receiving and shifting SAD data and adding the shifted data and SAD data, thereby outputting a partial SAD. Accordingly, the motion estimator can perform a process fast, and particularly, can perform half-pixel based searching fast and effectively.

9 Claims, 16 Drawing Sheets

| | | | | | | | | | | |
|---|---|---|---|---|---|---|---|---|---|---|
| LINE #1 | ○ ○ ○ ○ ··· ○ ··· ○ ○ ○ ○ |
| LINE #2 | ◇ ◇ ◇ ◇ ··· ◇ ··· ◇ ◇ ◇ ◇ |
| LINE #3 | □ □ □ □ ··· □ ··· □ □ □ □ |
| LINE #4 | ○ ○ ○ ○ ··· ○ ··· ○ ○ ○ ○ |

| PAR# | PBR# | PCR# | L0 | L1 | L2 | L3 |
|---|---|---|---|---|---|---|
| PER#LOAD | PER#LOAD | POR#LOAD | LOAD | X | X | X |
| HOLD | HOLD | HOLD | L0(0,0) | LOAD | X | X |
| SHIFT | HOLD | HOLD | L0(0,1) | X | X | X |
| SHIFT | HOLD | HOLD | L0(0,2) | X | X | X |
| SHIFT | HOLD | HOLD | L0(0,3) | X | X | X |
| SHIFT | HOLD | HOLD | L0(0,4) | X | X | X |
| SHIFT | HOLD | HOLD | L0(0,5) | X | X | X |
| SHIFT | HOLD | HOLD | L0(0,6) | X | X | X |
| SHIFT | HOLD | HOLD | L0(0,7) | X | X | X |
| SHIFT | HOLD | HOLD | L0(0,8) | X | X | X |
| NEXT LINE LOAD | HOLD | HOLD | L0(1,0) | L1(1,0) | LOAD | X |
| HOLD | SHIFT | HOLD | L0(1,1) | L1(1,1) | X | X |
| HOLD | SHIFT | HOLD | L0(1,2) | L1(1,2) | X | X |
| ⋮ | ⋮ | ⋮ | ⋮ | ⋮ | ⋮ | ⋮ |
| HOLD | SHIFT | HOLD | L0(1,8) | L1(1,8) | X | X |
| HOLD | NEXT LINE LOAD | HOLD | L0(2,0) | L1(2,0) | L2(2,0) | LOAD |
| HOLD | HOLD | SHIFT | L0(2,1) | L1(2,1) | L2(2,1) | X |
| HOLD | HOLD | SHIFT | L0(2,2) | L1(2,2) | L2(2,2) | X |
| ⋮ | ⋮ | ⋮ | ⋮ | ⋮ | ⋮ | ⋮ |
| HOLD | HOLD | SHIFT | L0(2,8) | L1(2,8) | L2(2,8) | X |
| HOLD | HOLD | NEXT LINE LOAD | L0(3,0) | L1(3,0) | L2(3,0) | L3(3,0) |
| SHIFT | HOLD | HOLD | L0(3,1) | L1(3,1) | L2(3,1) | L3(3,1) |
| SHIFT | HOLD | HOLD | L0(3,2) | L1(3,2) | L2(3,2) | L3(3,2) |
| ⋮ | ⋮ | ⋮ | ⋮ | ⋮ | ⋮ | ⋮ |
| SHIFT | HOLD | HOLD | L0(3,8) | L1(3,8) | L2(3,8) | L3(3,8) |
| NEXT LINE LOAD | HOLD | HOLD | L0(4,0) | L1(4,0) | L2(4,0) | L3(4,0) |
| HOLD | SHIFT | HOLD | L0(4,1) | L1(4,1) | L2(4,1) | L3(4,1) |
| HOLD | SHIFT | HOLD | L0(4,2) | L1(4,2) | L2(4,2) | L3(4,2) |
| ⋮ | ⋮ | ⋮ | ⋮ | ⋮ | ⋮ | ⋮ |

9 CLOCKS (spans from the L0(0,0) row to the L0(0,8) row)

O : ALPHA    ◇ : BETA    □ : GAMMA

FIG. 9

| PAR# | PBR# | PCR# | L0 | L1 | L2 | L3 |
|---|---|---|---|---|---|---|
| PER#LOAD | PER#LOAD | POR#LOAD | LOAD | X | X | X |
| HOLD | HOLD | HOLD | ALPHA L0(0,0) | LOAD | X | X |
| HOLD | HOLD | HOLD | BETA L0(0,0) | X | X | X |
| HOLD | HOLD | HOLD | GAMMA L0(0,0) | X | X | X |
| SHIFT | SHIFT | HOLD | ALPHA L0(0,1) | X | X | X |
| HOLD | HOLD | HOLD | GAMMA L0(0,1) | X | X | X |
| NEXT LINE LOAD | RELOAD | HOLD | ALPHA L0(1,0) | ALPHA L1(1,0) | LOAD | X |
| HOLD | HOLD | HOLD | BETA L0(1,0) | BETA L1(1,0) | X | X |
| HOLD | HOLD | HOLD | GAMMA L0(1,0) | GAMMA L1(1,0) | X | X |
| HOLD | SHIFT | SHIFT | ALPHA L0(1,1) | ALPHA L1(1,1) | X | X |
| HOLD | HOLD | HOLD | GAMMA L0(1,1) | GAMMA L1(1,1) | X | X |
| HOLD | NEXT LINE LOAD | RELOAD | ALPHA L0(1,0) | ALPHA L1(2,0) | ALPHA L2(2,0) | LOAD |
| HOLD | HOLD | HOLD | BETA L0(2,0) | BETA L1(2,0) | BETA L2(2,0) | X |
| HOLD | HOLD | HOLD | GAMMA L0(2,0) | GAMMA L1(2,0) | GAMMA L2(2,0) | X |
| SHIFT | HOLD | SHIFT | ALPHA L0(2,1) | ALPHA L1(2,1) | ALPHA L2(2,1) | X |
| HOLD | HOLD | HOLD | GAMMA L0(2,1) | GAMMA L1(2,1) | GAMMA L2(2,1) | X |
| RELOAD | RELOAD | NEXT LINE LOAD | ALPHA L0(3,0) | ALPHA L1(3,0) | ALPHA L2(3,0) | ALPHA L3(3,0) |
| HOLD | HOLD | HOLD | BETA L0(3,0) | BETA L1(3,0) | BETA L2(3,0) | BETA L3(3,0) |
| HOLD | HOLD | HOLD | GAMMA L0(3,0) | GAMMA L1(3,0) | GAMMA L2(3,0) | GAMMA L3(3,0) |
| SHIFT | SHIFT | HOLD | ALPHA L0(3,1) | ALPHA L1(3,1) | ALPHA L2(3,1) | ALPHA L3(3,1) |
| HOLD | HOLD | HOLD | GAMMA L0(3,1) | GAMMA L1(3,1) | GAMMA L2(3,1) | GAMMA L3(3,1) |
| X | RELOAD | HOLD | ALPHA L0(4,0) | ALPHA L1(4,0) | ALPHA L2(4,0) | ALPHA L3(4,0) |
| X | HOLD | HOLD | BETA L0(4,0) | BETA L1(4,0) | BETA L2(4,0) | BETA L3(4,0) |
| X | HOLD | HOLD | GAMMA L0(4,0) | GAMMA L1(4,0) | GAMMA L2(4,0) | GAMMA L3(4,0) |
| X | SHIFT | SHIFT | ALPHA L0(4,1) | ALPHA L1(4,1) | ALPHA L2(4,1) | ALPHA L3(4,1) |

24 CLOCKS

FIG. 12
A → READ
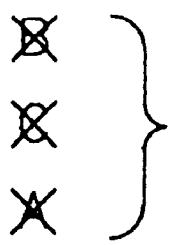
} SKIP
B → READ
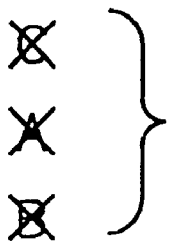
} SKIP
C → READ
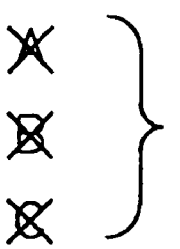
} SKIP
A
·
·
·
·

FIG. 13

| PAR# | PBR# | PCR# | L0 | L1 | L2 | L3 |
|------|------|------|------|------|------|------|
| 1'st LINE LOAD | 2'nd LINE LOAD | 3'rd LINE LOAD | LOAD | X | X | X |
| HOLD | HOLD | HOLD | L0(0,0) | LOAD | X | X |
| SHIFT | HOLD | HOLD | L0(0,1) | X | X | X |
| SHIFT | HOLD | HOLD | L0(0,2) | X | X | X |
| SHIFT | HOLD | HOLD | L0(0,3) | X | X | X |
| SHIFT | HOLD | HOLD | L0(0,4) | X | X | X |
| SHIFT | HOLD | HOLD | L0(0,5) | X | X | X |
| SHIFT | HOLD | HOLD | L0(0,6) | X | X | X |
| SHIFT | HOLD | HOLD | L0(0,7) | X | X | X |
| SHIFT | HOLD | HOLD | L0(0,8) | X | X | X |
| 5'th LINE LOAD | HOLD | HOLD | L0(1,0) | L1(1,0) | LOAD | X |
| HOLD | SHIFT | HOLD | L0(1,1) | L1(1,1) | X | X |
| HOLD | SHIFT | HOLD | L0(1,2) | L1(1,2) | X | X |
| ⋮ | ⋮ | | | | | |
| HOLD | SHIFT | HOLD | L0(1,8) | L1(1,8) | X | X |
| HOLD | 6'th LINE LOAD | HOLD | L0(2,0) | L1(2,0) | L2(2,0) | LOAD |
| HOLD | HOLD | SHIFT | L0(2,1) | L1(2,1) | L2(2,1) | X |
| HOLD | HOLD | SHIFT | L0(2,2) | L1(2,2) | L2(2,2) | X |
| ⋮ | ⋮ | | | | | |
| HOLD | HOLD | SHIFT | L0(2,8) | L1(2,8) | L2(2,8) | X |
| HOLD | HOLD | 7'th LINE LOAD | L0(3,0) | L1(3,0) | L2(3,0) | L3(3,0) |
| SHIFT | HOLD | HOLD | L0(3,1) | L1(3,1) | L2(3,1) | L3(3,1) |
| SHIFT | HOLD | HOLD | L0(3,2) | L1(3,2) | L2(3,2) | L3(3,2) |
| ⋮ | ⋮ | | | | | |
| SHIFT | HOLD | HOLD | L0(3,8) | L1(3,8) | L2(3,8) | L3(3,8) |
| 9'th LINE LOAD | HOLD | HOLD | L0(4,0) | L1(4,0) | L2(4,0) | L3(4,0) |
| HOLD | SHIFT | HOLD | L0(4,1) | L1(4,1) | L2(4,1) | L3(4,1) |
| HOLD | SHIFT | HOLD | L0(4,2) | L1(4,2) | L2(4,2) | L3(4,2) |
| ⋮ | ⋮ | | | | | |

← 9 CLOCKS →

 : DATA SELECTED TO BE PROCESSED

A → READ
X̶ → SKIP
C → READ
X̶ → SKIP
B
X̶
A
X̶
C
X̶
B
X̶
A
⋮

CANDIDATE BLOCK CORRESPONDING TO SEARCH POINT(0,0)
<PREVIOUS FRAME>

BLOCK TO BE PROCESSED
<CURRENT FRAME>

FIG. 16

| PAR# | PBR# | PCR# | L0 | L1 | L2 | L3 |
|---|---|---|---|---|---|---|
| 1'st LINE LOAD | 2'nd LINE LOAD | 1'st LINE LOAD | LOAD | X | X | X |
| HOLD | HOLD | HOLD | L0(0,0) | LOAD | X | X |
| SHIFT | HOLD | HOLD | L0(0,1) | X | X | X |
| SHIFT | HOLD | HOLD | L0(0,2) | X | X | X |
| SHIFT | HOLD | HOLD | L0(0,3) | X | X | X |
| SHIFT | HOLD | HOLD | L0(0,4) | X | X | X |
| 3'rd LINE LOAD | HOLD | HOLD | L0(1,0) | L1(1,0) | LOAD | X |
| HOLD | HOLD | SHIFT | L0(1,1) | L1(1,1) | X | X |
| HOLD | HOLD | SHIFT | L0(1,2) | L1(1,2) | X | X |
| HOLD | HOLD | SHIFT | L0(1,3) | L1(1,3) | X | X |
| HOLD | HOLD | SHIFT | L0(1,4) | L1(1,4) | X | X |
| HOLD | HOLD | 3'rd LINE LOAD | L0(2,0) | L1(2,0) | L2(2,0) | X |
| HOLD | SHIFT | HOLD | L0(2,1) | L1(2,1) | L2(2,1) | X |
| HOLD | SHIFT | HOLD | L0(2,2) | L1(2,2) | L2(2,2) | X |
| HOLD | SHIFT | HOLD | L0(2,3) | L1(2,3) | L2(2,3) | X |
| HOLD | SHIFT | HOLD | L0(2,4) | L1(2,4) | L2(2,4) | X |
| HOLD | 4'th LINE LOAD | HOLD | L0(3,0) | L1(3,0) | L2(2,0) | L3(3,0) |
| SHIFT | HOLD | HOLD | L0(3,1) | L1(3,1) | L2(2,1) | L3(3,1) |
| SHIFT | HOLD | HOLD | L0(3,2) | L1(3,2) | L2(2,2) | L3(3,2) |
| SHIFT | HOLD | HOLD | L0(3,3) | L1(2,3) | L2(2,3) | L3(3,3) |
| SHIFT | HOLD | HOLD | L0(3,4) | L1(2,4) | L2(2,4) | L3(3,4) |
| 5'th LINE LOAD | HOLD | HOLD | L0(4,0) | L1(4,0) | L2(4,0) | L3(4,0) |
| HOLD | HOLD | SHIFT | L0(4,1) | L1(4,1) | L2(4,1) | L3(4,1) |
| HOLD | HOLD | SHIFT | L0(4,2) | L1(4,2) | L2(4,2) | L3(4,2) |
| ⋮ | | | ⋮ | ⋮ | | |

← 5 CLOCKS →

 : DATA SELECTED TO BE PROCESSED

FIG. 18

| PAR# | PBR# | PCR# | L0 | L1 | L2 | L3 |
|---|---|---|---|---|---|---|
| 1'st LINE LOAD | 2'nd LINE LOAD | 1'st LINE LOAD | LOAD | X | X | X |
| HOLD | HOLD | HOLD | L0(0,0) | LOAD | X | X |
| SHIFT | HOLD | HOLD | L0(0,1) | X | X | X |
| SHIFT | HOLD | HOLD | L0(0,2) | X | X | X |
| SHIFT | HOLD | HOLD | L0(0,3) | X | X | X |
| SHIFT | HOLD | HOLD | L0(0,4) | X | X | X |
| 2'nd LINE LOAD | HOLD | HOLD | L0(1,0) | L1(1,0) | LOAD | X |
| HOLD | SHIFT | HOLD | L0(1,1) | L1(1,1) | X | X |
| HOLD | SHIFT | HOLD | L0(1,2) | L1(1,2) | X | X |
| HOLD | SHIFT | HOLD | L0(1,3) | L1(1,3) | X | X |
| HOLD | SHIFT | HOLD | L0(1,4) | L1(1,4) | X | X |
| HOLD | 2'nd LINE LOAD | HOLD | L0(2,0) | L1(2,0) | L2(2,0) | X |
| HOLD | HOLD | SHIFT | L0(2,1) | L1(2,1) | L2(2,1) | X |
| HOLD | HOLD | SHIFT | L0(2,2) | L1(2,2) | L2(2,2) | X |
| HOLD | HOLD | SHIFT | L0(2,3) | L1(2,3) | L2(2,3) | X |
| HOLD | HOLD | SHIFT | L0(2,4) | L1(2,4) | L2(2,4) | X |
| HOLD | HOLD | 2'nd LINE LOAD | L0(3,0) | L1(3,0) | L2(2,0) | L3(3,0) |
| SHIFT | HOLD | HOLD | L0(3,1) | L1(3,1) | L2(2,1) | L3(3,1) |
| SHIFT | HOLD | HOLD | L0(3,2) | L1(3,2) | L2(2,2) | L3(3,2) |
| SHIFT | HOLD | HOLD | L0(3,3) | L1(2,3) | L2(2,3) | L3(3,3) |
| SHIFT | HOLD | HOLD | L0(3,4) | L1(2,4) | L2(2,4) | L3(3,4) |
| 3'rd LINE LOAD | HOLD | HOLD | L0(4,0) | L1(4,0) | L2(4,0) | L3(4,0) |
| HOLD | SHIFT | HOLD | L0(4,1) | L1(4,1) | L2(4,1) | L3(4,1) |
| HOLD | SHIFT | HOLD | L0(4,2) | L1(4,2) | L2(4,2) | L3(4,2) |
| ⋮ | ⋮ | | | | | |

← 5 CLOCKS →

 : DATA SELECTED TO BE PROCESSED

MOTION ESTIMATOR

BACKGROUND OF THE INVENTION

1. Field of the Invention

The present invention relates to a motion estimator, and more particularly, to a motion estimator capable of performing fast motion estimation during compression of a moving picture. The present application is based on Korean Patent Application No. 00-4049, which is incorporated herein by reference.

2. Description of the Related Art

Motion estimation is used for increasing compression efficiency by removing temporal redundancy of input video data in a video coder. General standards for compressing a moving picture are mostly based on block-based coders. Such block-based coders use a block matching algorithm. The block matching algorithm performs block-based motion estimation. According to the block matching algorithm, a block most similar to a certain block in a current frame is selected from candidate blocks positioned within a search area of a previous frame. Here, the relative local difference between the block to be processed in the current frame and the most similar candidate block in the previous frame is referred to as a motion vector (MV). Generally, the sum of absolute differences (SAD) is calculated for motion estimation. When motion estimation is performed in 16×16 block units, the SAD and the MV are calculated by Equation (1) and Equation (2), respectively.

$$SAD(u, v) = \sum_{i=0}^{15} \sum_{j=0}^{15} |C(i, j) - P(i+u, j+v)| \quad (1)$$

$$MV = arg_{(u,v)} \min SAD(u,v) \quad (2)$$

Here, c(i,j) is block data of a current frame, P(i+u,j+v) is candidate block data of a previous frame, and (u,v) is a motion vector candidate.

When a motion estimator is actually designed based on such calculation, the performance and the amount of operation of motion estimation should be considered. For motion estimation, most of the amount of operation is for calculation of the SAD. In other words, subtraction, calculation of an absolute value and a cumulative operation should be performed to calculate the single SAD. In particular, the amount of such calculation is proportional to the size of a block to be processed. According to a conventional motion estimation method, it takes much time to estimate motion because the amount of operation is large.

To solve this problem, a hierarchical motion estimation method has been proposed. FIG. 1 is a diagram illustrating this hierarchical motion estimation method. According to the hierarchical motion estimation method illustrated in FIG. 1, an image of a lower layer is subsampled, thereby generating a subsampled image of a middle layer and a subsampled image of an upper layer. Next, the SAD is calculated with respect to the subsampled image of the upper layer to select initial search area candidates from the image of the middle layer. Then, more search area candidates are selected from the image of the middle layer using the interrelation between peripheral macro blocks. The SADs are calculated with respect to the selected initial search area candidates, and a final MV at a position having a minimum SAD is obtained for the image of the lower layer.

Such a method does not decrease the performance and achieves fast processing compared to a full search method. However, faster motion estimation is still desired.

SUMMARY OF THE INVENTION

To solve the above problems, it is an object of the present invention to provide a motion estimator for performing fast motion estimation.

Accordingly, to achieve the above object of the invention, there is provided a motion estimator for performing motion estimation to compress an image data frame. The motion estimator includes a first memory comprising a previous search area memory having a plurality of memory areas for storing previous search area data by lines and a current process area memory for storing current process area data by lines; a previous search area data provider for shifting and outputting the previous search area data output from the plurality of memory areas in circles; a first switching part for selecting the previous search area data output from the previous search area data provider; a second switching part for selecting the current process area data output from the current process area memory by rows; a calculator comprising a plurality of sum of absolute differences (SAD) calculators connected in parallel, the plurality of SAD calculators calculating SADs of the selected previous process area data and the current process area data; and a shift register for receiving and shifting SAD data output from a series of SAD calculators of the calculator and adding the shifted data and SAD data output from another series of SAD calculators, thereby outputting a partial SAD.

It is preferable that when the size of a search area is set to p, the calculator includes p SAD calculators connected in parallel, and the shift register includes 2p+1 shift registers.

The motion estimator preferably further includes a buffer for buffering input data; a 25-shift register for 25-shifting data output from the buffer; an adder for adding the partial SAD and data output from the 25-shift register, thereby outputting a SAD; a SAD comparison and motion vector generation unit for generating a motion vector using the SAD output from the adder; and a 20-shift register for 20-shifting the motion vector and outputting the result to the SAD comparison and motion vector generation unit.

Preferably, the motion estimator further includes a 22-shift register for performing a 22-shifting operation to additionally obtain an initial search point using the interrelation between motion vectors of peripheral macro blocks in a middle layer, when hierarchical motion estimation using 3 layers is performed.

The motion estimator preferably further includes a DMA controller for controlling the current process area data and the previous search area data to be separately stored in the first memory and for providing data to the calculator depending on the process of a motion estimation controller; the motion estimation controller for controlling motion estimation in response to a control signal output from the DMA controller; and a second memory for storing the calculated partial SAD.

The first memory is divided into the previous search area memory having three areas and the current process area memory, the calculator comprises first, second, third and fourth SAD calculators for calculating SADs using the previous search area data and the current process area data. The shift register includes a first 9-shift register for 9-shifting and outputting SAD data output from the first SAD calculator; a first adder for adding output data from the first 9-shift register and output data from the second SAD calculator; a second 9-shift register for 9-shifting and outputting SAD data output from the second SAD calculator; a second adder for adding output data from the second 9-shift register and output data from the third SAD calculator; a third 9-shift register for 9-shifting and outputting SAD data output from the third SAD calculator; and a third adder for adding output data from the third 9-shift register and output data from the fourth SAD calculator.

Preferably, each of the first through fourth SAD calculators comprises registers and subtracters, one input port of each of the subtracters being connected to the output port of a respective register, and the other input port of each of the subtracters being connected to a respective switch.

Preferably, the motion estimator further includes an interpolator for performing interpolation on the previous search area data and outputting the resulting data of the interpolation.

The motion estimator further includes a DMA controller for discriminating between the previous search area data and the current process area data and controlling data to be provided to the previous search area data provider and the calculator depending on a processing state.

BRIEF DESCRIPTION OF THE DRAWINGS

The above objective and advantages of the present invention will become more apparent by describing in detail a preferred embodiment thereof with reference to the attached drawings in which:

FIG. 6 is a diagram illustrating data flow in the motion estimator of FIG. 2;

FIG. 9 is a diagram illustrating data flow in the motion estimator of FIG. 2 when a half-pixel based search is used;

FIG. 12 is a diagram illustrating a procedure of performing 4:1 decimation on previous search area data in a vertical direction;

FIG. 13 is a diagram illustrating data processing flow in an upper layer;

FIG. 16 is a diagram illustrating data processing flow in a middle layer;

FIG. 18 is a diagram illustrating data processing flow in a lower layer.

DETAILED DESCRIPTION OF THE PRESENT INVENTION

Hereinafter, a preferred embodiment of the present invention will be described in detail with reference to the attached drawings.

A motion estimator according to an embodiment of the present invention is based on a hierarchical motion estimation method using 3 layers. Calculation of a SAD is performed on a 16×16 block in a lower layer, a 8×8 block in a middle layer and a 4×4 block in an upper layer. In other words, the middle layer is obtained by performing ½ decimation on the lower layer, and the upper layer is obtained by performing ½ decimation on the middle layer. In addition, a search is performed in units of ±4 pixels in the upper layer, and in units of ±2 pixels in the middle and lower layers. The motion estimator of this embodiment performs estimation on the lower layer in half-pixel units after completing estimation for the lower layer in full-pixel units. An improved motion estimation method disclosed in Korea Patent Application No. 98-6718 filed by the present applicant and incorporated into this specification as a reference is used as an example. According to the motion estimation method disclosed in the above patent application, at least one macro block candidate is additionally selected using the interrelation between peripheral macro blocks in the lower layer together with macro block candidates selected from the middle layer.

Figure 1:
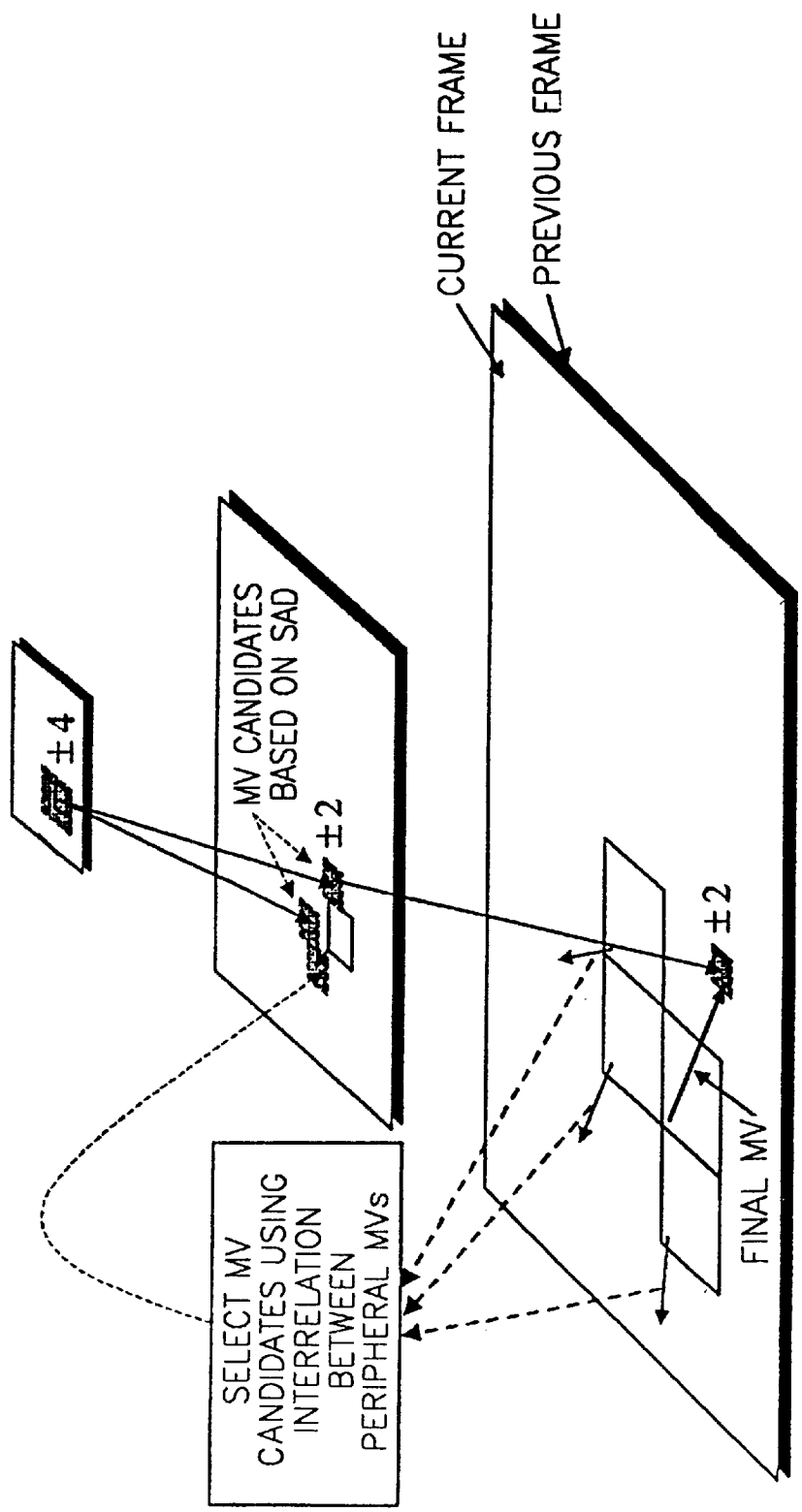
FIG. 1 is a diagram illustrating a conventional hierarchical motion estimation method.
Figure 2:
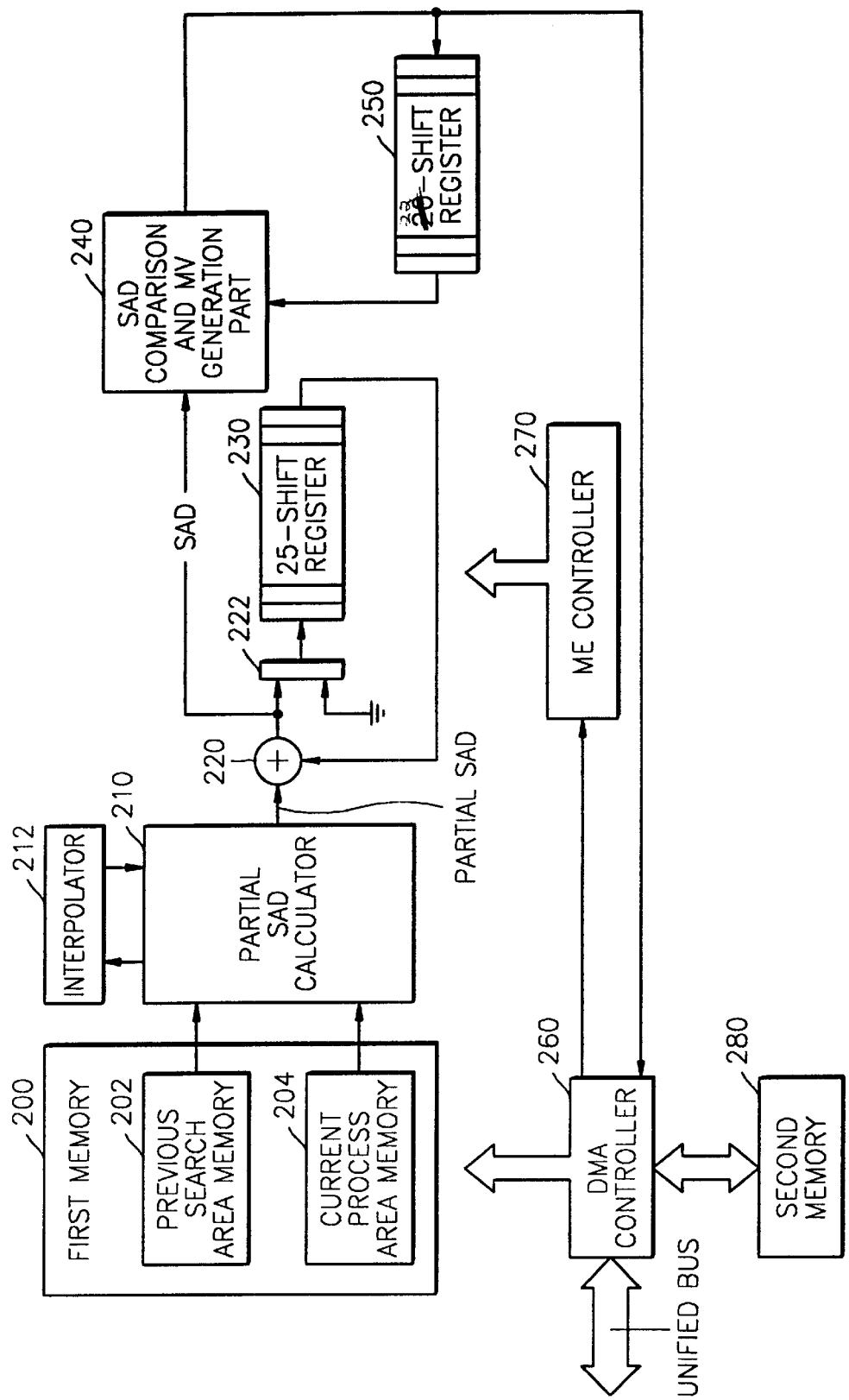
FIG. 2 is a block diagram illustrating the configuration of a motion estimator according to an embodiment of the present invention.

Referring to FIG. 2, the motion estimator according to a preferred embodiment of the present invention includes a first memory 200, a partial Sum of Absolute Differences (SAD) calculator (processing element (PE)) 210, an interpolator 212, an adder 220 and a buffer 222. In addition, the motion estimator includes a 25-shift register 230, a SAD comparison and motion vector (MV) generation part 240, a 22-shift register 250, a direct memory access (DMA) controller 260, a motion estimation (ME) controller 270 and a second memory 280. The first memory is divided into a previous search area memory 202 and a current process area memory 204.

In operation, the DMA controller 260 controls current block data and previous search area data to be separately stored in the first memory 200 for performing motion estimation. The DMA controller 260 also controls the first memory 200 to provide data to the Partial SAD calculator 210 depending on the process of the ME controller 270.

The Partial SAD calculator 210 receives current block data and previous search area data and calculates a partial SAD. The motion estimator includes the 22-shift register 250 to obtain an initial search point using the interrelation between the MVs of peripheral macro blocks in a middle layer when performing hierarchical motion estimation using 3 layers.

Figure 3A:
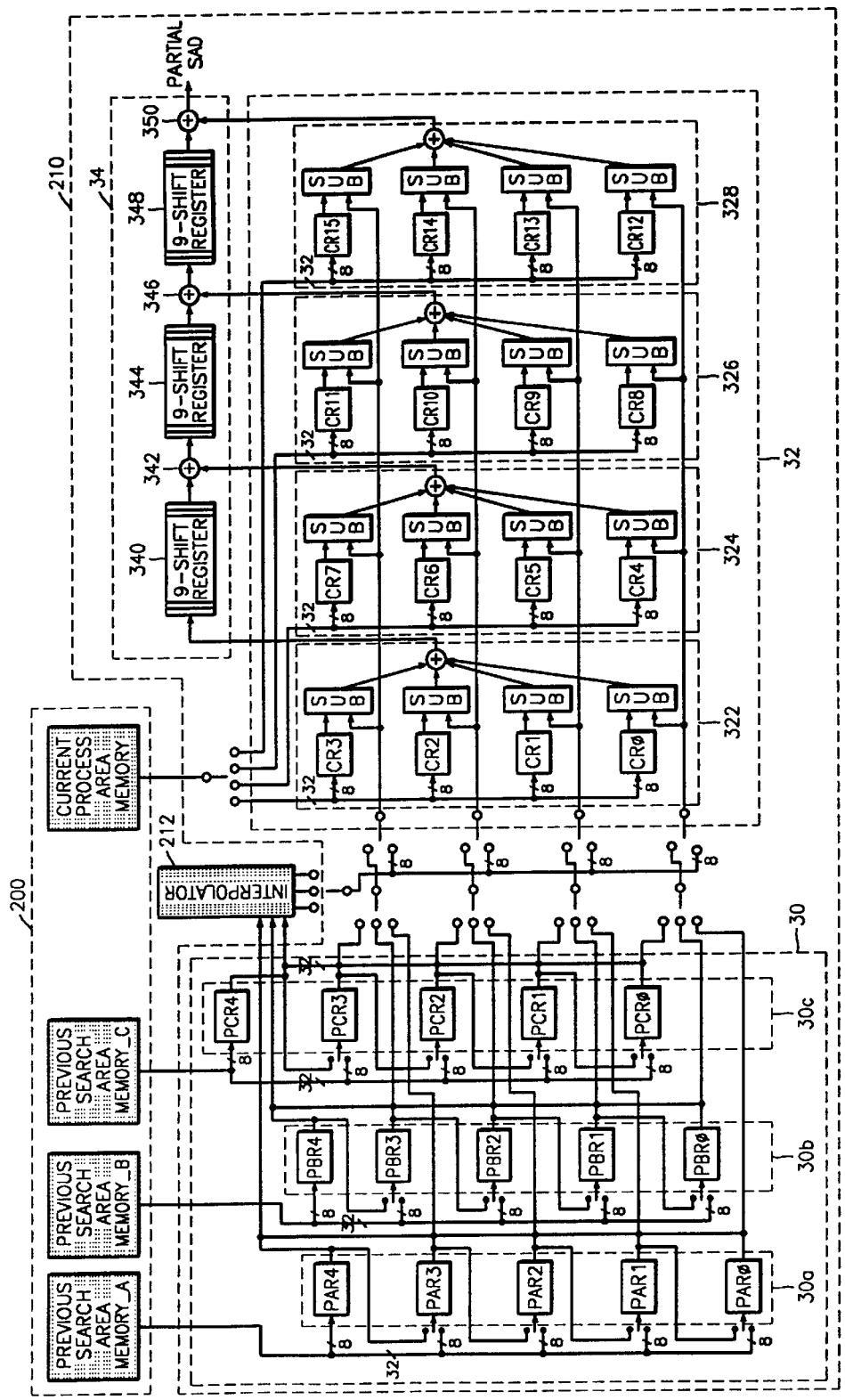
FIG. 3A is a detailed diagram illustrating the first memory, the partial SAD calculator and the interpolator of the motion estimator of FIG. 2.
Figure 3B:
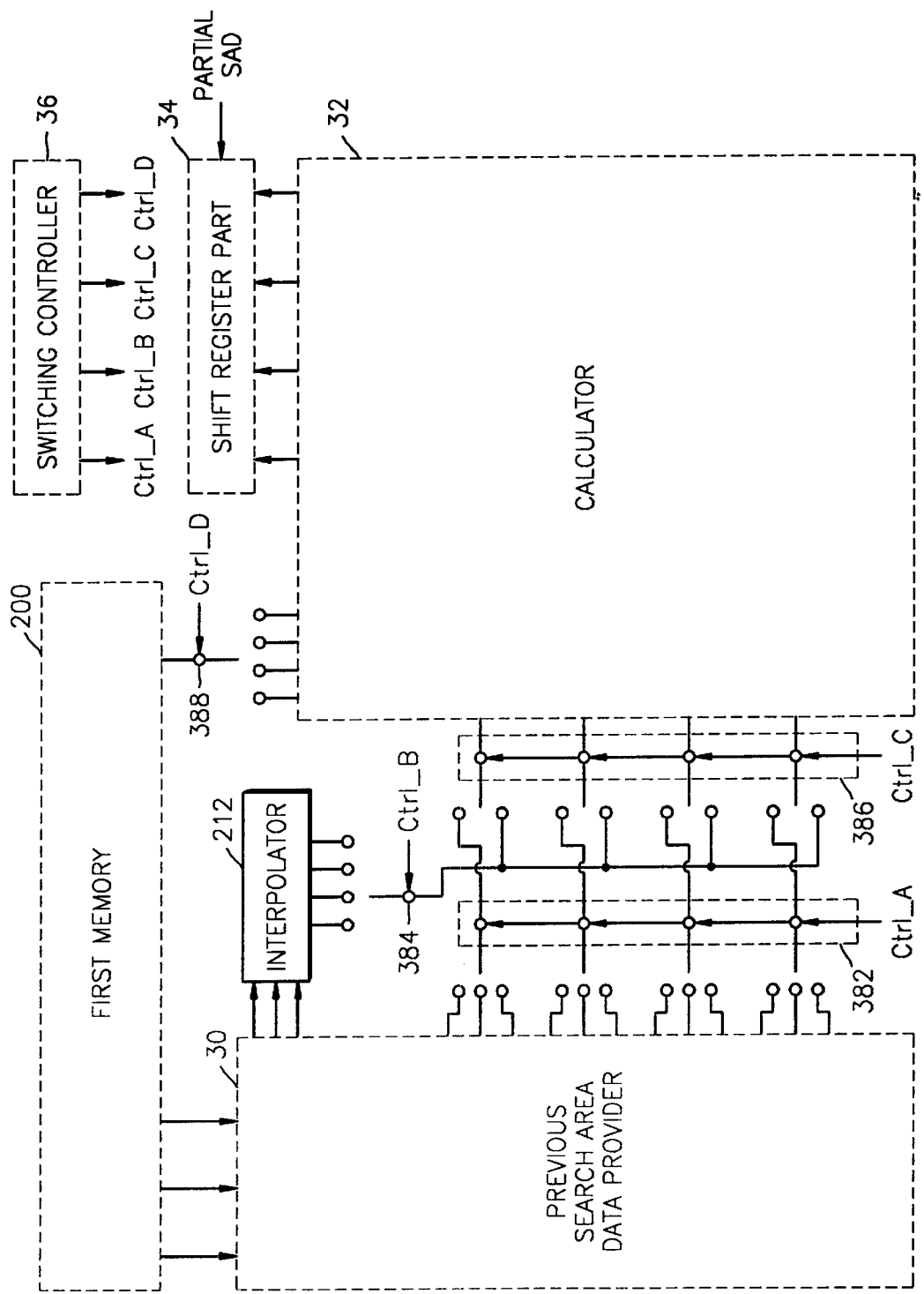
FIG. 3B is a detailed diagram illustrating the switches and the switching controller of the motion estimator of FIG. 2.

FIG. 3A illustrates in detail the first memory 200, the Partial SAD calculator 210 and the interpolator 212 of the motion estimator of FIG. 2. Referring to FIG. 3A, the first memory 200 is divided into a previous search area memory having three regions (a previous search area memory_A, a previous search area memory_B and a previous search area memory_C) and a current process area memory. The Partial SAD calculator 210 includes a previous search area data provider 30, a calculator 32 and a shift register part 34. Referring to FIG. 3B, switching parts 382 and 386 are provided between the previous search area data provider 30 and the calculator 32. A switch 384 is provided between the output port of the interpolator 212 and the calculator 32. A switch 388 is provided between the output port of the current process area memory and the calculator 32. In this embodiment, the switches and the switching parts are controlled by a switching controller 36 outputting control signals Ctrl_A, Ctrl_B, Ctrl_C and Ctrl_D. The switching controller 36 may be provided within the ME controller 270.

The previous search area data provider 30 includes a first previous search area data provider 30a, a second previous search area data provider 30b and a third previous search area data provider 30c. The calculator 32 includes a first SAD calculator 322, a second SAD calculator 324, a third SAD calculator 326 and a fourth SAD calculator 328. The shift register part 34 includes a first 9-shift register 340, a second 9-shift register 344, a third 9-shift register 348 and adders 342, 346 and 350.

In operation, the switching part 382 selects previous search area data output from the previous search area data provider 30 in response to the control signal Ctrl_A. The switch 388 selects a row of current process area data output from the current process area memory in response to the control signal Ctrl_D. The Partial SAD calculator 210 receives data corresponding to a previous search area from the previous search area memory and data corresponding to a current block to be processed from the current process area memory and calculates a partial SAD. The DMA controller 260 identifies the data corresponding to the previous search area and the data corresponding to the current block to be processed. The partial SAD calculator 210 of this embodiment can perform an operation only on a search area of ±4 with respect to a 4×4 block. Accordingly, the motion estimator of this embodiment obtains the SAD of a block larger than a 4×4 block, using the adder 220, the buffer 222 and the 25-shift register 230.

The partial SAD calculator 210 receives previous search area data and current process area data through the three channels of the previous search area memories (the previous search area memory_A, the previous search area memory_B and the previous search area memory_C) and the channel of the current process area memory.

Figures 4, 5:
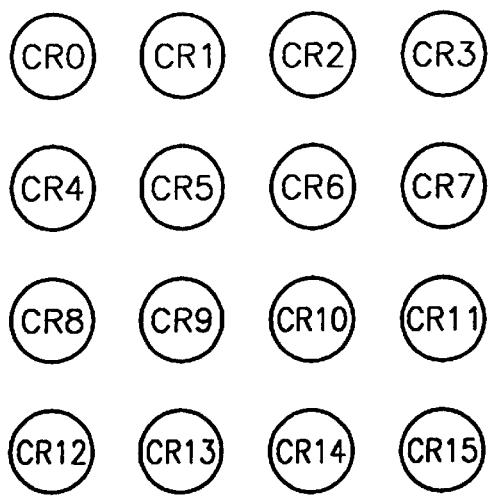
FIG. 4 is a diagram illustrating the order in which previous search area data is arranged in a memory.
FIG. 5 is a diagram illustrating the order in which current block data of 4□4 pixels is arranged in registers within the calculator shown in FIGS. 3A and 3B.

FIG. 4 illustrates the order in which the previous search area data is arranged in the memory. Referring to FIG. 4, the data of a first line of a previous search area is output from the previous search area memory_A, the data of a second line is output from the previous search area memory_B, and the data of a third line is output from the previous search area memory_C. Next, the data of a fourth line of the previous search area is output from the previous search area memory_A. In FIG. 4, the data output from the previous search area memory_A is represented by "○", the data output from the previous search area memory_B is represented by "◇", and the data output from the previous search area memory_C is represented by "□".

The partial SAD calculator 210 also receives current process area data from the current process area memory. FIG. 5 illustrates the order in which current process area data of 4×4 pixels is arranged in the registers within the calculator 32 of FIG. 3A. As shown in FIG. 5, the current process area data composed of 4×4 pixels is loaded onto the registers CR0, CR1, ..., CR15 of FIG. 3A. While the current process area data is being stored in the registers CR0, CR1, ..., CR15, the previous search area data is loaded onto registers PAR0, PAR1, ..., PAR4, PBR1, ..., PBR4, PCR0, ..., PCR4. After the data is completely loaded onto the registers, each of the subtracters SUB of the partial SAD calculator 210 calculates the difference between the previous search area data and the current process area data. Although not shown, SAD calculators receive the differences from the subtracters, respectively, and output the absolute values of the differences. The outputs of SAD calculators are values obtained by performing operations on respective pixels, and these values which have the same horizontal element are added. With such an arrangement, the absolute values of differences of the individual lines of a current process area are calculated when previous search area data is input once.

For clarity of description, first pixel data from the left on the top line of the previous search area data of FIG. 4 is defined as p(0, 0). Pixel data at a position shifted from the pixel data p(0, 0) to the right side by one pixel is defined as p(0, 1). Pixel data at a position shifted from the pixel data p(0, 0) to the right side by two pixels is defined as p(0, 2). Pixel data at a position shifted downward from the pixel data p(0, 0) by one pixel is defined as p(1, 0). Pixel data at a position shifted downward from the pixel data p(0, 0) by two pixels is defined as p(2, 0).

Similarly, first pixel data from the left on the top line of the current process area data of FIG. 5 is defined as c(0, 0). Pixel data at a position shifted from the pixel data c(0, 0) to the right side by one pixel is defined as c(0, 1). Pixel data at a position shifted from the pixel data c(0, 0) to the right side by two pixels is defined as c(0, 2). Pixel data at a position shifted downward from the pixel data c(0, 0) by one pixel is defined as c(1, 0). Pixel data at a position shifted downward from the pixel data c(0, 0) by two pixels is defined as c(2, 0).

With such definitions, the data c(0, 0) is loaded onto the register CR0. The data c(0, 1) is loaded onto the register CR1. The data c(1, 0) is loaded onto the register CR4. The data c(1, 1) is loaded onto the register CR5. The data c(3, 3) is loaded onto the register CR15.

The partial SAD calculator 210 performs an operation on a current process area in line units so that the values resulting from the operation, L0(0, 0), L1(0, 0), L2(0, 0) and L3(0, 0) output from the first through fourth SAD calculators 322, 324, 326 and 328 can be expressed by Equation (3a), Equation (3b), Equation (3c) and Equation (3d), respectively.

$$L0(0,0)=|c(0,0)-p(0,0)|+|c(0,1)-p(0,1)|+|c(0,2)-p(0,2)|+|c(0,3)-p(0,3)| \quad (3a)$$

$$L1(0,0)=|c(1,0)-p(0,0)|+|c(1,1)-p(0,1)|+|c(1,2)-p(0,2)|+|c(1,3)-p(0,3)| \quad (3b)$$

$$L2(0,0)=|c(2,0)-p(0,0)|+|c(2,1)-p(0,1)|+|c(2,2)-p(0,2)|+|c(2,3)-p(0,3)| \quad (3c)$$

$$L3(0,0)=|c(3,0)-p(0,0)|+|c(3,1)-p(0,1)|+|c(3,2)-p(0,2)|+|c(3,3)-p(0,3)| \quad (3d)$$

The result values L0(0, 0), L1(0, 0), L2(0, 0) and L3(0, 0) correspond to the first through fourth lines, respectively, of the current process area data. When it is assumed that i is a positive number indicating a row and j is a positive number indicating a column, and when previous search area data is represented by p(i,j), the results of performing operations on the previous search area data p(i,j) and the respective first through fourth lines of the present process area data are represented by L0(i,j), L1(i,j), L2(i,j) and L3(i,j). Based on these representations, the SAD of first data from the left on the top line of a search area can be expressed by Equation (4).

$$SAD=L0(0,0)+L1(1,0)+L2(2,0)+L3(3,0) \quad (4)$$

The previous search area data is input to the partial SAD calculator 210 line by line. Accordingly, the SAD calculated from Equation (4) is an SAD first obtained by the partial SAD calculator 210.

The value L0(0, 0) is obtained by performing an operation on the first lines of the previous search area data and the current process area data. However, the value L1(0, 0) can be obtained only when the second line of the previous search area data is input to the partial SAD calculator 210. The value L2(0, 0) can be obtained only when the third line of the previous search area data is input to the partial SAD calculator 210. The value L3(0, 0) can be obtained only when the fourth line of the previous search area data is input to the partial SAD calculator 210. In other words, when a search area is set to a range of −p to +p, the values L0(0, 0) and L1(0, 0) are obtained with the time difference corresponding to 2p+1. Accordingly, a time delay of 2p+1 clocks is required in order to add the values L0(0, 0) and L1:(0, 0). In this embodiment, the search area is set to a range of −4 to +4, so a time delay of 9 clocks is required. The 9-shift registers 340, 344 and 348 of the shift register part 34 are provided for delay operations. Referring back to FIG. 3A, the first 9-shift register 340 shifts SAD data output from the first SAD calculator 322 by 9 clocks and outputs the result. The first adder 342 adds the output data of the first 9-shift register 340 and the output data of the second SAD calculator 324. The second 9-shift register 344 shifts SAD data output from the second SAD calculator 324 by 9 clocks and outputs the result. The second adder 346 adds the output data of the second 9-shift register 344 and the output data of the third SAD calculator 326. The third 9-shift register 348 shifts SAD data output from the third SAD calculator 326 by 9 clocks and outputs the result. The third adder 350 adds the output data of the third 9-shift register 348 and the output data of the fourth SAD calculator 328. Data output from the third adder 350 is a partial SAD for the given search area.

Referring to FIG. 6, a delay of 9 clocks is required in order to add the values L0(0, 0) and L1(0, 0) in the motion estimator of this embodiment. In addition, a delay other than the 9-clock delay necessary for loading the first line of the previous search area data to the register part 34 does not occur in the motion estimator of this embodiment. In other words, the values L0(0, 0), L1(1, 0), L2(2, 0) and L3(3, 0) represented by hatched blocks in FIG. 6 are sequentially obtained every clock. Next, the values L0(0, 1), L1(1, 1), L2(2, 1) and L3(3, 1) represented by dotted blocks in FIG. 6 are sequentially obtained every clock. Accordingly, the total time necessary for obtaining individual SADs for the search area of 4×4 pixels through full searching is 9×12 clocks, i.e., 108 clocks, when initial data loading time is excepted.

After completing full-pixel based searching, a motion estimator according to the present invention performs half-pixel based searching on the basis of a MV point obtained through the full-pixel based searching.

The interpolator 212 receives data from the three previous search area memories (the previous search area memory_A, the previous search area memory_B and the previous search area memory_C).

Figure 7:
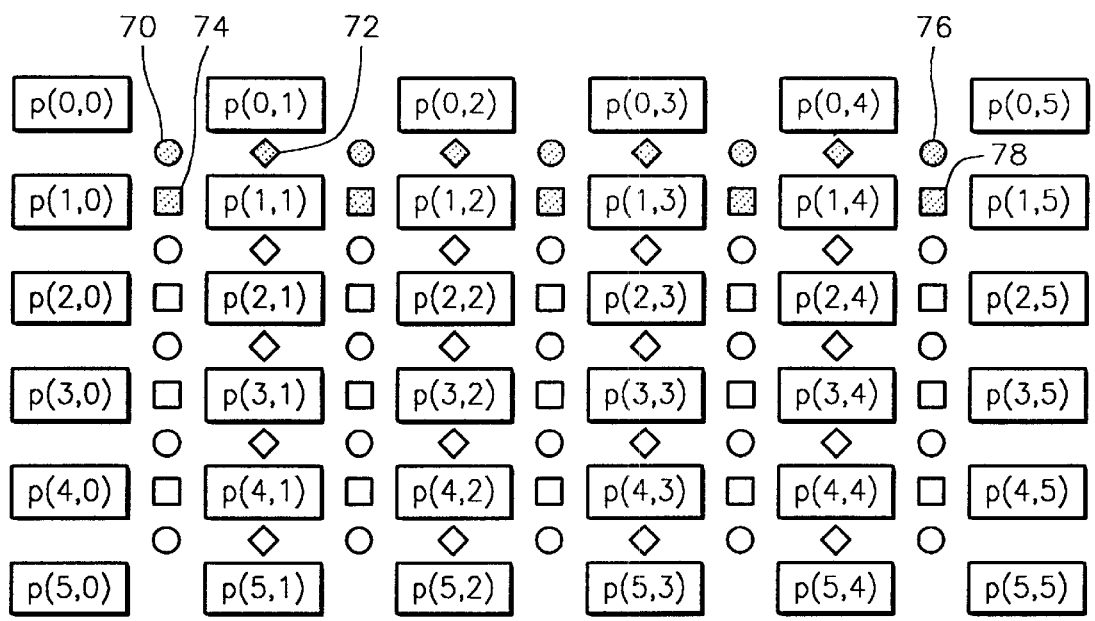
FIG. 7 is a diagram illustrating a search procedure performed in half-pixel units in a motion estimator according to the present invention.

A half-pixel based searching procedure used in the motion estimator of this embodiment will be described with reference to FIG. 7. Search points should be determined for the half-pixel based searching. When the search points are represented by alpha(i,j), beta(i,j) and gamma(i,j), they can be defined as in Equation (5a), Equation (5b) and Equation (5c), respectively.

$$\text{alpha}(i,j)=p(i,j)+p(i+1,j)+p(i,j+1)+p(i+1,j+1)//4 \quad (5a)$$

$$\text{beta}(i,j)=p(i,j)+p(i,j+1)//2 \quad (5b)$$

$$\text{gamma}(i,j)=p(i,j)+p(i,j+1)//2 \quad (5c)$$

For example, a search point corresponding to alpha(0,0) is referred to as 70, a search point corresponding to beta(0,1) is referred to as 72, and a search point corresponding to gamma(1,0) is referred to as 74. A search point corresponding to alpha(0,4) is referred to as 76, and a search point corresponding to gamma(1,4) is referred to as 78.

Figure 8:
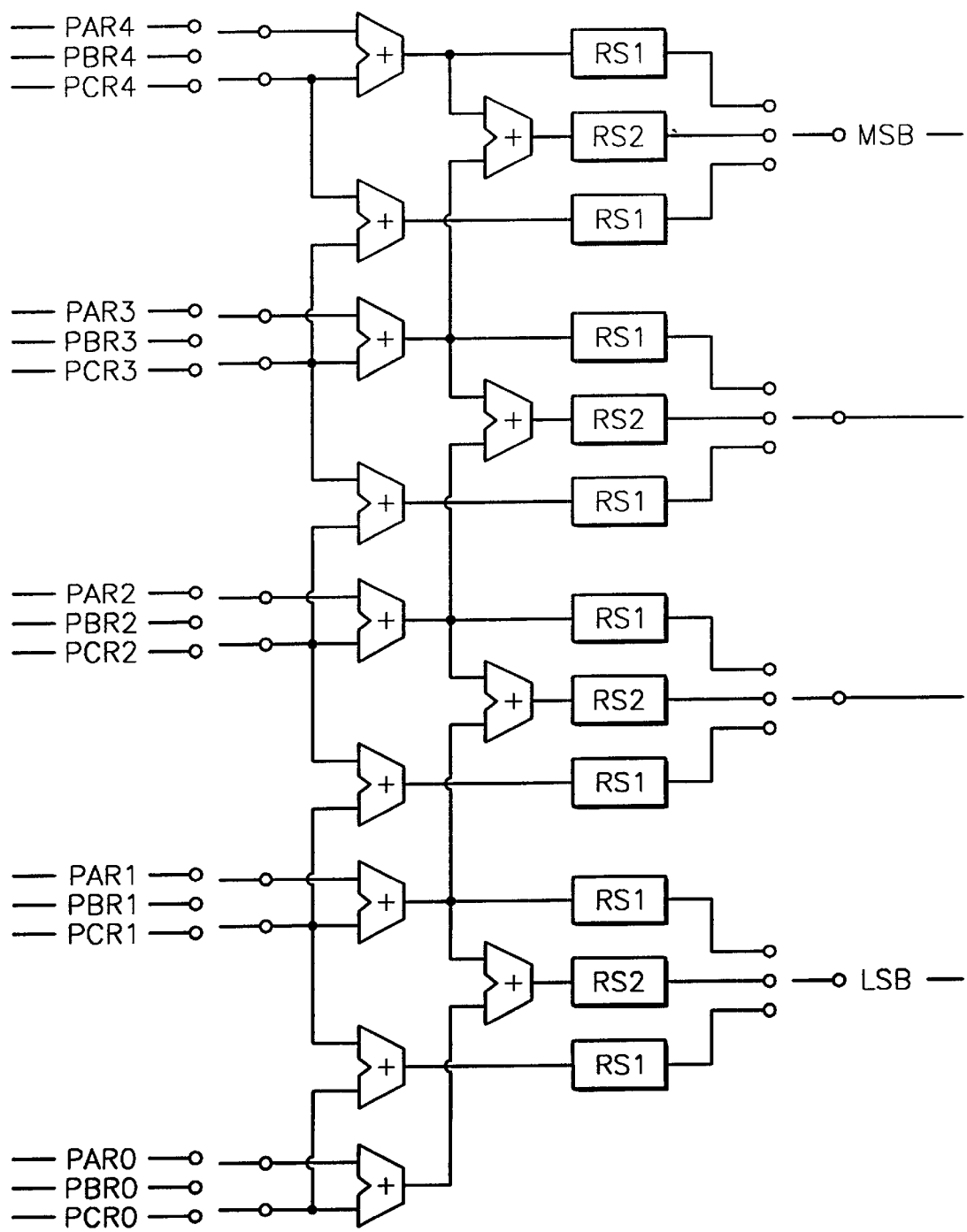
FIG. 8 is a block diagram illustrating an example of the interpolator of the motion estimator of FIG. 2.

FIG. 8 illustrates an example of the interpolator 212 of the motion estimator of FIG. 2. For example, the interpolator 212 selectively receives previous search area data from two registers among the registers PAR0, PBR0 and PCR0, previous search area data from two registers among the registers PAR1, PBR1 and PCR1, previous search area data from two registers among the registers PAR2, PBR2 and PCR2, previous search area data from two registers among the registers PAR3, PBR3 and PCR3 and previous search area data from two registers among the registers PAR4, PBR4 and PCR4. Then, the interpolator 212 performs interpolation according to Equations (5a), (5b) and (5c), thereby obtaining alpha, beta and gamma pixel values. The interpolator 212 sequentially outputs the pixel values through output ports.

Consequently, the interpolator 212 outputs 4-bit interpolated data including a most significant bit (MSB) and a least significant bit (LSB). The switch 384 sequentially switches from one of the output ports of the interpolator 212 to another in response to the control signal Ctrl_B, thereby selecting data to be input into the calculator 32. The switching part 386 selects interpolated data in response to the control signal Ctrl_C and outputs the interpolated data to the calculator 32. A partial SAD with respect to the interpolated data is obtained by the calculator 32 and the shift register part 34.

In other words, a motion estimator according to the present invention can simultaneously generate the pixel values of alpha, beta and gamma search points at a single operation of reading previous frame area data. Accordingly, the processing speed of a motion estimator according to the present invention is faster than that of a conventional motion estimator.

In addition, when motion estimation is performed on another 4×4 area after motion estimation on one 4×4 area is completed, for example, the pixel value of a search point 76 corresponding to alpha(0,4) and the pixel value of a search point 78 corresponding to beta(1,4) can be obtained by shift-writing previous search area data already read. Accordingly, a motion estimator according to the present invention can efficiently perform fast half-pixel based searching.

FIG. 9 illustrates data flow appearing when half-pixel based searching is applied to the motion estimator of FIG. 2. Referring to FIG. 9, it takes 24 clocks for the motion estimator to complete the half-pixel based searching on a single 4×4 block.

The processing unit of the partial SAD calculator 210 provided in the motion estimator of FIG. 2 is a 4×4 block.

When this motion estimator is used for 3-layer hierarchical searching, the motion estimator performs full searching on a search area of −4 through +4 pixels within a 4×4 block in an upper layer. The motion estimator performs searching on a search area of −2 through +2 pixels within an 8×8 block in a middle layer. The motion estimator performs searching on a search area of −2 through +2 pixels within a 16×16 block in a lower layer.

Figure 10:
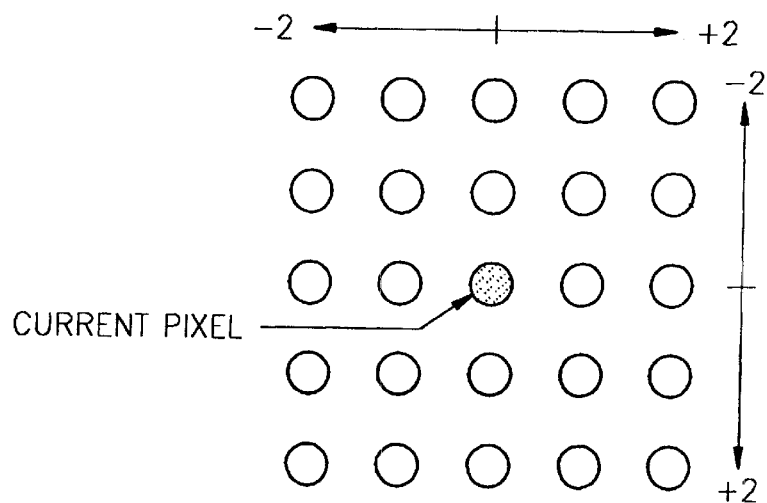
FIG. 10 is a diagram illustrating a search area in middle and lower layers, which is used for a hierarchical search performed in a motion estimator according to the present invention.

The partial SAD calculator 210 of the motion estimator of FIG. 2 can process a 4×4 block. Accordingly, to perform motion estimation on the middle layer of an 8×8 block and the lower layer of a 16×16 block, it is necessary to divide the middle layer into 4 blocks and the lower layer into 16 blocks, calculate SADs on the individual blocks and add the result values. However, since a search area in each of the middle and lower layers corresponds to −2 through +2 pixels, as shown in FIG. 10, a partial SAD with respect to 25 points can be obtained through a single searching operation. For this, referring to FIG. 2, a motion estimator according to the present invention includes the 25-shift register 230. The motion estimator inputs a partial SAD into the 25-shift register 230, shifts data stored in the 25-shift register 230 whenever a succeeding partial SAD is output, and adds a partial SAD with respect to a first 4×4 block and a partial SAD with respect to a next 4×4 block, thereby performing a searching operation on each of the middle and lower layers.

Figure 11:
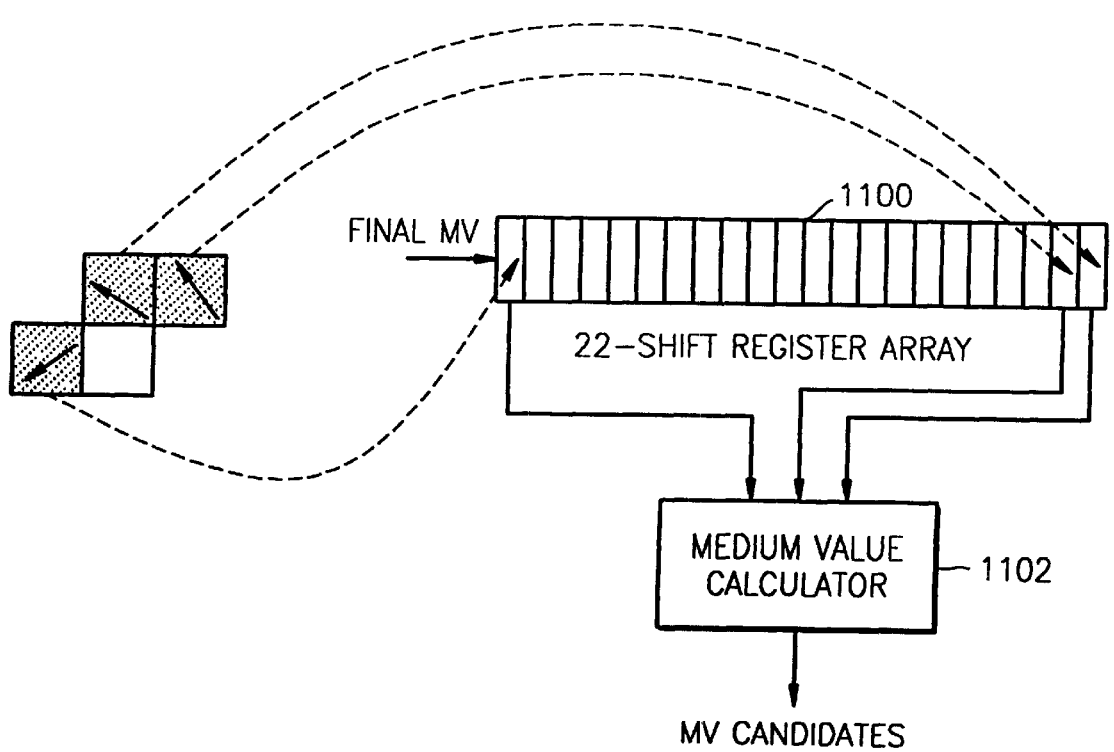
FIG. 11 is a diagram illustrating an example of the configuration of the 22-shift register for selecting one more initial search points using the interrelation between peripheral macro blocks in the motion estimator of FIG. 2.

The motion estimator of FIG. 2 selects one among three initial search points based on the interrelation between neighboring macro blocks. The locations of the peripheral macro blocks can be set as shown in FIG. 11. Since a MV is obtained starting from the upper left of an input image frame in a horizontal direction, the distance between a current block and a macro block above the current block is the same as the number of horizontal macro blocks in the input image frame. Accordingly, when it is assumed that the input image frame is a CIF type image of 352×288 pixels, the input image frame having a maximum size has 22 macro blocks in the horizontal direction. Accordingly, in another embodiment of the present invention, a motion estimator further includes a 22-shift register array 1100 and a medium value calculator 1102. The 22-shift register array 1100 receives MVs of peripheral macro blocks, and the medium value calculator 1102 outputs a medium value of the MVs as a MV candidate, thereby further selecting a MV candidate using the interrelation between peripheral macro blocks. The selected MV candidate is used as an initial search point of a middle layer.

In 3-layer hierarchical searching which is applied to a motion estimator according an embodiment of the present invention, upper layer data is obtained by performing 4:1 decimation on original data. In the present embodiment, decimation is performed in such a manner as to take original data every 4 samples. Since current process area data is stored in a single current process area memory, the current process area data is taken in horizontal and vertical directions every 4 samples. Since previous search area data is separately stored in three previous search area memories, the previous search area data is taken every 4 samples during horizontal decimation, like the current process area data, but vertical decimation on the previous search area data is performed as shown in FIG. 12. In other words, since the previous search area data is stored in the previous search area memory according to this embodiment, such that the first line of the search area data is stored in the previous search area memory_A, the second line is stored in the previous search area memory_B, and the third line is stored in the previous search area memory_C, the DMA controller 260 of FIG. 2 is required to increase an address by 4 and control data to be read from the previous search area memory in order of the previous search area memory_A, the previous search area memory_B and the previous search area memory_C.

The data read from the memory is stored in the registers of the partial SAD calculator 210. Full searching is performed on a search area of a range of ±4 pixels so that two positions having a minimum SAD are selected as initial search points of a middle layer. Data processing flow in an upper layer is as shown in FIG. 13. FIG. 13 is substantially the same as FIG. 6, and thus a description thereof will be omitted.

Figures 14, 15:
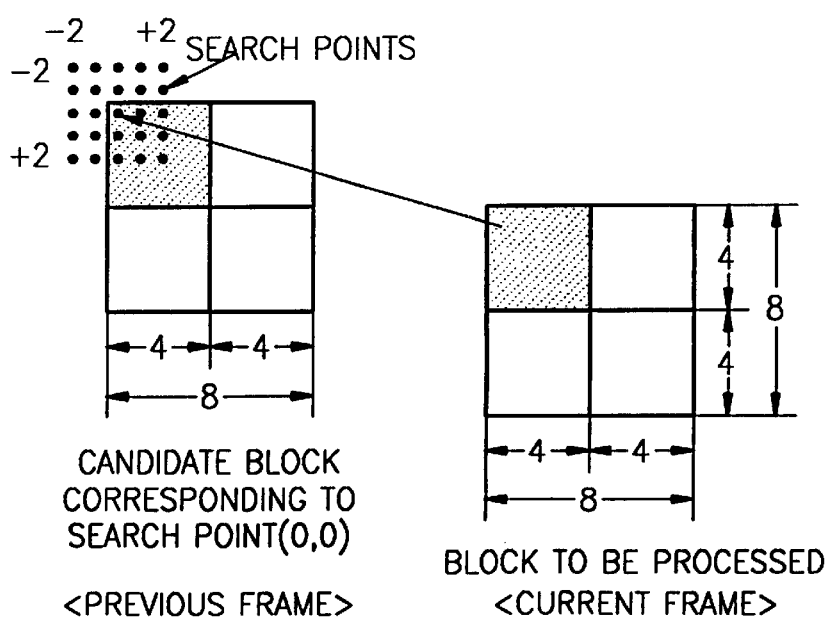
FIG. 14 is a diagram illustrating a procedure of performing 2:1 decimation on previous search area data in a vertical direction.
FIG. 15 is a diagram illustrating data processing in a middle layer.

Middle layer data is obtained by performing 2:1 decimation on lower layer data. Accordingly, an address is increased by 2 in the horizontal and vertical directions in each of the current process area memory and the previous search area memory so that reading and skipping are performed on data stored in the memory, as shown in FIG. 14. Since previous search area data is separately stored in three memories, the data is read in order of the previous search area memory_A, the previous search area memory_B and the previous search area memory_C in the vertical direction so that 2:1 decimation can be performed on the previous search area data in the vertical direction.

In a middle layer, a partial SAD is obtained by performing full searching on a ±2 pixel search area with respect to an 8×8 block which is determined on the basis of two initial search points found from an upper layer and one initial search point corresponding to a MV candidate obtained from the 22-shift register 250. Since the partial SAD calculator 210 is designed to perform searching in 4×4 block units, an 8×8 block in a current frame should be divided into four 4×4 blocks, as shown in FIG. 15 in order to perform searching on the middle layer of an 8×8 block. In other words, the partial SAD of 25 points in a ±2 pixel search area is obtained with respect to the first 4×4 block and stored in the 25-shift register 230. Then, the adder 220 adds the partial SAD obtained with respect to the first 4×4 block and a partial SAD obtained with respect to the next 4×4 block. A SAD with respect to an 8×8 block is obtained by repeating the above processes four times. SADs with respect to individual ±2 pixel search areas on the basis of the three initial search points in the middle layer are obtained, and one having a minimum SAD among the three initial search points is used as an initial search point in a lower layer. Data processing flow in the middle layer is shown in FIG. 16. Referring to FIG. 16, a delay of 5 clocks is required in the middle layer in order to add L0(0, 0) and L1(1, 0). In other words, hatched blocks L0(0, 0), L1(1, 0), L2(2, 0) and L3(3, 0) are sequentially obtained every clock, and then dotted blocks L0(0, 1), L1(1, 1), L2(2, 1) and L3(3, 1) are sequentially obtained every clock.

Figure 17:
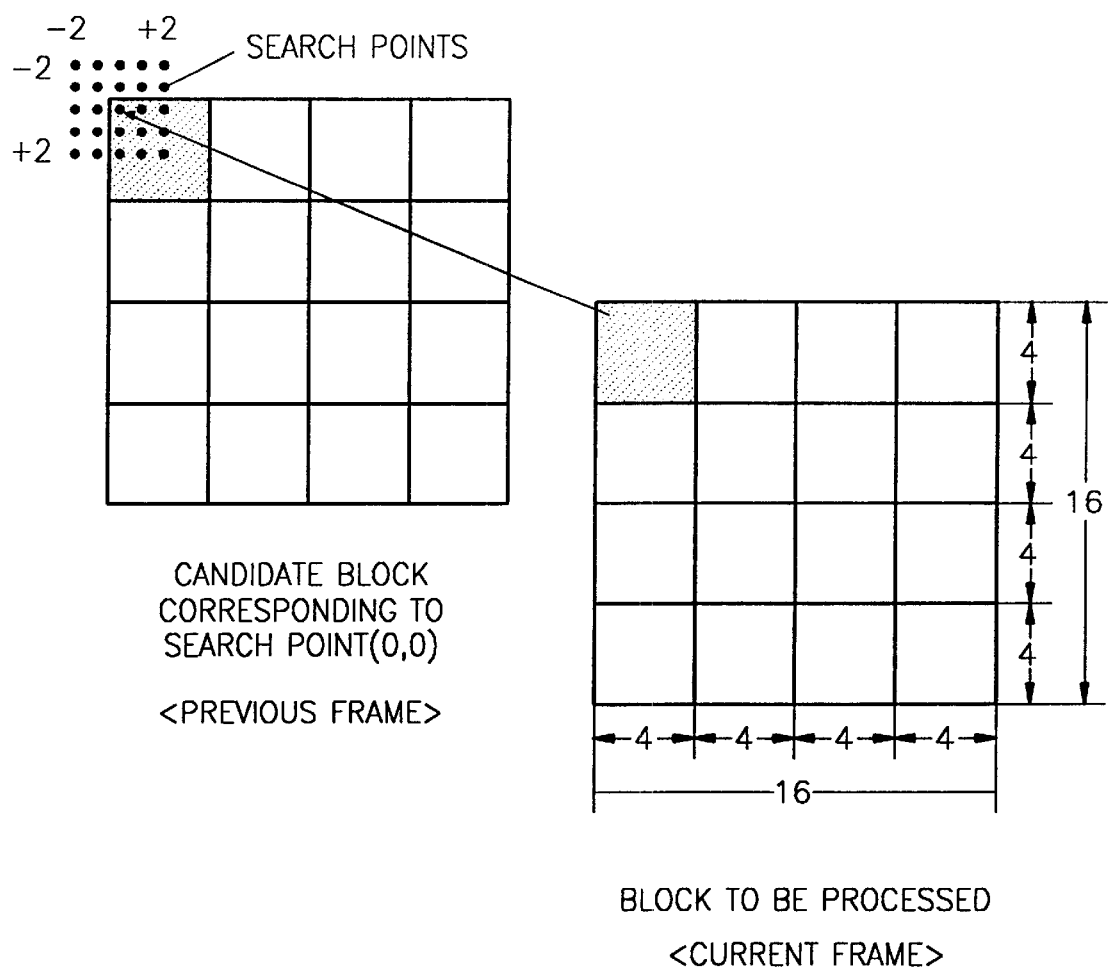
FIG. 17 is a diagram illustrating data processing in a lower layer.

Lower layer data is original data. A position having a minimum SAD is obtained by fully searching a ±2 pixel search area with respect to a 16×16 block on the basis of the initial search point found from the middle layer. From this position, a final MV in full-pixel based searching is obtained. Motion estimation on the lower layer is performed on a 16×16 block, as shown in FIG. 17. Since the partial SAD calculator 210 performs a process in 4×4 block units, a SAD with respect to the 16×16 block can be obtained by repeatedly performing the searching in 4×4 block units 16 times. Data processing flow in the lower layer is shown in FIG. 18. The data processing flow of FIG. 18 is the same as FIG. 16 illustrating the data processing flow in the middle layer where searching is performed on an area of ±2 pixels, and thus a description thereof will be omitted.

As described above, a motion estimator according to the present invention performs a process fast, and particularly, effectively performs half-pixel based searching fast.

While the present invention has been described with respect to the particular embodiments, it will be apparent to those skilled in the art that various changes and modifications may be made without departing from the spirit and scope of the invention as defined in the following claims.

What is claimed is:

1. A motion estimator for performing motion estimation to compress an image data frame, the motion estimator comprising:

a first memory comprising a previous search area memory having a plurality of memory areas for storing previous search area data by lines and a current process area memory for storing current process area data by lines;

a previous search area data provider for shifting and outputting the previous search area data output from the plurality of memory areas in circles;

a first switching part for selecting the previous search area data output from the previous search area data provider;

a second switching part for selecting the current process area data output from the current process area memory by rows;

a calculator comprising a plurality of sum of absolute differences (SAD) calculators connected in parallel, the plurality of SAD calculators calculating SADs of the selected previous process area data and the current process area data; and a shift register for receiving and shifting SAD data output from a series of SAD calculators of the calculator and adding the shifted data and SAD data output from another series of SAD calculators, thereby outputting a partial SAD.

2. The motion estimator of claim 1, wherein when the size of a search area is set to p, the calculator comprises p SAD calculators connected in parallel, and the shift register comprises 2p+1 shift registers.

3. The motion estimator of claim 1 or 2, further comprising:

a buffer for buffering input data;

a 25-shift register for 25-shifting data output from the buffer;

an adder for adding the partial SAD and data output from the 25-shift register, thereby outputting a SAD;

a SAD comparison and motion vector generation unit for generating a motion vector using the SAD output from the adder; and a 20-shift register for 20-shifting the motion vector and outputting the result to the SAD comparison and motion vector generation unit.

4. The motion estimator of claim 1, further comprising a 22-shift register for performing a 22-shifting operation to additionally obtain an initial search point using the interrelation between motion vectors of peripheral macro blocks in a middle layer, when hierarchical motion estimation using 3 layers is performed.

5. The motion estimator of claim 1, further comprising:

a DMA controller for controlling the current process area data and the previous search area data to be separately stored in the first memory and for providing data to the calculator;

a motion estimation controller for controlling motion estimation in response to a control signal output from the DMA controller; and a second memory for storing the calculated partial SAD.

6. The motion estimator of claim 1, wherein the first memory is divided into the previous search area memory having three areas and the current process area memory;

wherein the calculator comprises first, second, third and fourth SAD calculators for calculating SADs using the previous search area data and the current process area data; and wherein the shift register comprises:

a first 9-shift register for 9-shifting and outputting SAD data output from a first SAD calculator;

a first adder for adding output data from the first 9-shift register and output data from a second SAD calculator;

a second 9-shift register for 9-shifting and outputting SAD data output from the second SAD calculator;

a second adder for adding output data from the second 9-shift register and output data from a third SAD calculator;

a third 9-shift register for 9-shifting and outputting SAD data output from the third SAD calculator; and a third adder for adding output data from the third 9-shift register and output data from a fourth SAD calculator.

7. The motion estimator of claim 6, wherein each of the first through fourth SAD calculators comprises registers and subtracters, one input port of each of the subtracters being connected to an output port of a respective register, and another input port of each of the subtracters being connected to a respective switch.

8. The motion estimator of claim 1, further comprising an interpolator for performing interpolation on the previous search area data and outputting the resulting data of the interpolation.

9. The motion estimator of claim 1, further comprising a DMA controller for discriminating between the previous search area data and the current process area data and controlling data to be provided to the previous search area data provider and the calculator depending on a processing state.

* * * * *